United States Patent
Fujita

(10) Patent No.: US 8,928,946 B1
(45) Date of Patent: Jan. 6, 2015

(54) IMAGE READING DEVICE, IMAGE FORMING APPARATUS, AND IMAGE READING METHOD

(71) Applicant: KYOCERA Document Solutions Inc., Osaka-shi, Osaka (JP)

(72) Inventor: Hiroyuki Fujita, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/314,239

(22) Filed: Jun. 25, 2014

(30) Foreign Application Priority Data

Jun. 28, 2013 (JP) ................. 2013-136327
Jun. 28, 2013 (JP) ................. 2013-136328

(51) Int. Cl.
*H04N 1/407* (2006.01)
*H04N 1/56* (2006.01)
*H04N 1/00* (2006.01)
*G06T 5/00* (2006.01)

(52) U.S. Cl.
CPC ............ *H04N 1/56* (2013.01); *H04N 1/00801* (2013.01)
USPC .......... 358/3.26; 358/474; 358/498; 358/475; 358/1.13; 358/1.15

(58) Field of Classification Search
None
See application file for complete search history.

(56) References Cited

U.S. PATENT DOCUMENTS 5,682,227 A * 10/1997 Taguchi et al. ............... 355/25
2005/0122540 A1* 6/2005 Kadowaki ................. 358/1.15

FOREIGN PATENT DOCUMENTS

JP 2002247308 A 8/2002
JP 2005244825 A 9/2005

* cited by examiner

*Primary Examiner* — Quang N Vo
(74) *Attorney, Agent, or Firm* — Alleman Hall McCoy Russell & Tuttle LLP

(57) ABSTRACT

A cover member is openable and closable with respect to a document table, and has a color reference surface facing the document table, and a partial region provided on a color reference surface and having a predetermined density different from a density of the color reference surface. When a document determination portion determines that a document is a book document, a density correction portion corrects a density in a specific density correction range at a central portion in document image data read from a document by a image reading portion, based on a second density difference which is a density difference between a density of the color reference surface read by a reading control portion when a book document is placed on a document placement surface, and a density of the color reference surface read by the image reading portion when the cover member is closed.

18 Claims, 7 Drawing Sheets

IMAGE READING DEVICE, IMAGE FORMING APPARATUS, AND IMAGE READING METHOD

INCORPORATION BY REFERENCE

This application is based upon and claims the benefit of priority from the corresponding Japanese Patent Application No. 2013-136327 filed on Jun. 28, 2013, and Japanese Patent Application No. 2013-136328 filed on Jun. 28, 2013, the entire contents of which are incorporated herein by reference.

BACKGROUND

The present disclosure relates to an image reading device which reads image data from a document placed on a document table.

Generally, there is known an image reading device that radiates light from below to a document placed on a document table and receives the reflected light by a photoelectric conversion element such as a CCD, thereby reading image data from the document. In the case where, by using this type of image reading device, image data is read from a thick document (hereinafter, referred to as a "book document") such as a book formed by a plurality of sheets bound at the center, a gap occurs between the document table and a central portion of the book document. Therefore, the amount of light reflected from the central portion of the book document decreases, so that a black belt-like image appears at the central portion of the book document in image data read by the image reading device. Considering this, there is known an image processing device that has a special sensor for detecting the height of the central portion of a book document placed on a document table, and that converts a black belt-like image in image data into a white image in accordance with a result of detection by the sensor.

SUMMARY

An image reading device according to one aspect of the present disclosure includes a document table, an image reading portion, a cover member, a reading control portion, a document determination portion, and a density correction portion. The document table has a document placement surface which allows a document to be placed thereon. The image reading portion is configured to, based on light reflected when light is radiated through the document placement surface to a document placed on the document placement surface, read image data from the document. The cover member is configured to be openable and closable with respect to the document table, and has a color reference surface facing the document table and a partial region provided on the color reference surface, the partial region having a predetermined density different from a density of the color reference surface. The reading control portion is configured to read image data from the color reference surface and the partial region of the cover member by the image reading portion. The document determination portion configured to, when a first density difference which is a density difference between a density of the color reference surface and a density of the partial region in color reference image data read by the reading control portion is equal to or smaller than a predetermined first threshold value, determine that the document placed on the document placement surface is a book document. The density correction portion is configured to, when the document determination portion determines that the document is a book document, correct a density in a specific density correction range at a central portion in document image data read from the document by the image reading portion, based on a second density difference which is a density difference between a density of the color reference surface read by the reading control portion when the book document is placed on the document placement surface, and a density of the color reference surface read by the image reading portion when the cover member is closed.

An image forming apparatus according to another aspect of the present disclosure includes the image reading device and an image forming portion configured to form an image based on image data read by the image reading device.

An image reading method according to another aspect of the present disclosure is an image reading method including a reading control step, a document determination step, and a density correction step executed in an image reading device including a document table, an image reading portion, and a cover member. The document table has a document placement surface which allows a document to be placed thereon. The image reading portion is configured to, based on light reflected when light is radiated through the document placement surface to a document placed on the document placement surface, read image data from the document. The cover member is configured to be openable and closable with respect to the document table, and has a color reference surface facing the document table and a partial region provided on the color reference surface, the partial region having a predetermined density different from a density of the color reference surface. In the reading control step, image data is read from the color reference surface and the partial region of the cover member by the image reading portion. In the document determination step, when a first density difference which is a density difference between a density of the color reference surface and a density of the partial region in color reference image data read in the reading control step is equal to or smaller than a predetermined first threshold value, it is determined that the document placed on the document placement surface is a book document. In the density correction step, when it is determined in the document determination step that the document is a book document, a density in a specific density correction range at a central portion in document image data read from the document by the image reading portion is corrected based on a second density difference which is a density difference between a density of the color reference surface read in the reading control step when the book document is placed on the document placement surface, and a density of the color reference surface read by the image reading portion when the cover member is closed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the drawings, the embodiments of the present disclosure will be described for understanding of the present disclosure. It is noted that the following embodiments are examples in which the present disclosure is embodied, and are not intended to limit the technical scope of the present disclosure.

<Schematic Configuration of Multifunction Peripheral 10>

Figure 1A:
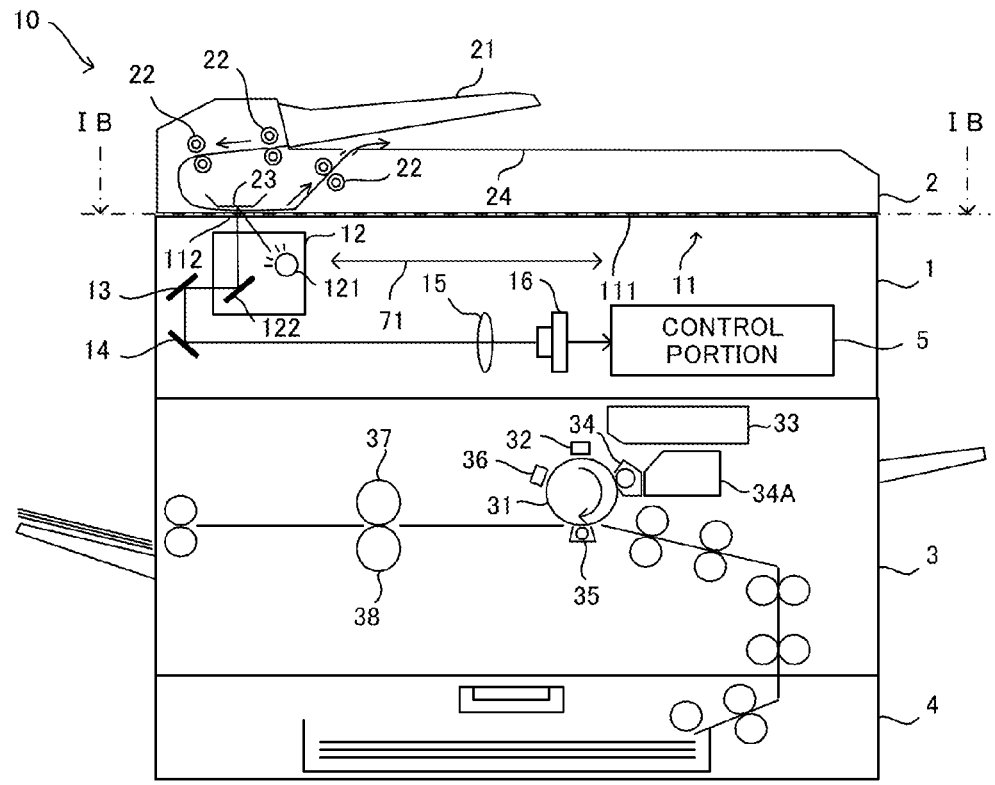
FIG. 1A and FIG. 1B are configuration diagrams of a multifunction peripheral according to an embodiment of the present disclosure.
Figure 1B:
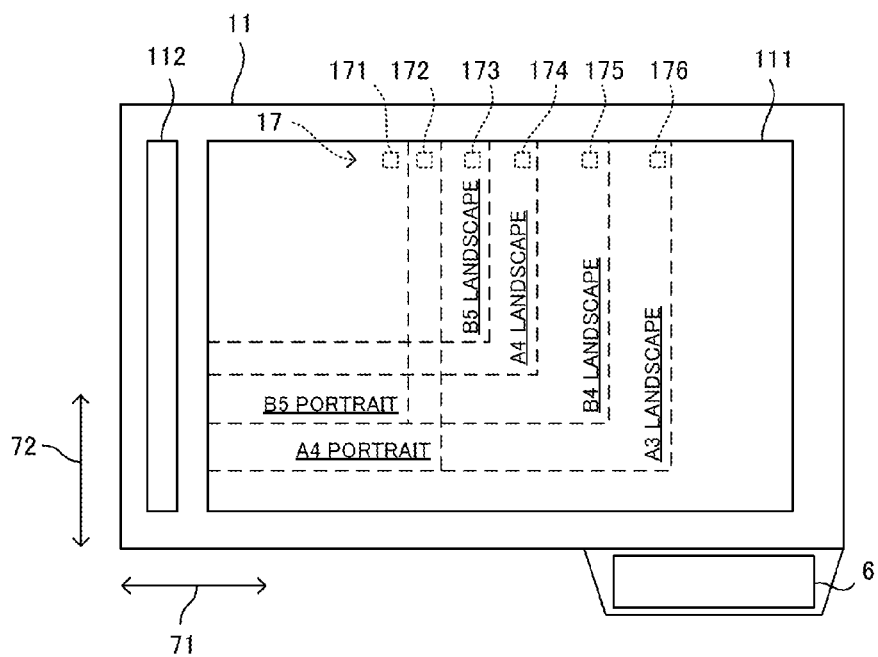

First, with reference to FIGS. 1A and 1B, the schematic configuration of a multifunction peripheral 10 according to an embodiment of the present disclosure will be described. It is noted that FIG. 1A is a schematic sectional view of the multifunction peripheral 10 and FIG. 1B is a view as seen from an IB-IB arrow direction in FIG. 1A.

The multifunction peripheral 10 is an image forming apparatus including an image reading portion 1, an ADF 2, an image forming portion 3, a sheet feed cassette 4, a control portion 5, an operation display portion 6, and the like. The operation display portion 6 is a touch panel or the like that displays various types of information in accordance with control instructions from the control portion 5 and allows input of various types of information to the control portion 5. It is noted that in the multifunction peripheral 10, the image reading portion 1, the ADF 2, and the control portion 5 compose an image reading device according to the present disclosure. In addition, the present disclosure is applicable to an image reading device or an image forming apparatus such as a scanner, a facsimile apparatus, and a copy machine.

The control portion 5 is a computer having control devices such as a CPU, a ROM, a RAM, and an EEPROM. The control portion 5 executes, by the CPU, various control programs stored in advance in the ROM, thereby performing overall control of the multifunction peripheral 10. The RAM is a volatile storage portion and the EEPROM is a nonvolatile storage portion, and these are used as a temporary storage memory for various processes executed by the CPU or an image memory. It is noted that the control portion 5 may be formed by an electronic circuit such as an integrated circuit (ASIC, DSP), or may be a control portion provided separately from a main control portion that performs overall control of the multifunction peripheral 10.

In the ROM of the control portion 5, an image reading program for causing the CPU of the control portion 5 to execute an image reading process (see flowchart in FIG. 4) described later is stored in advance. It is noted that the image reading program may be stored in a computer-readable storage medium such as a CD, a DVD, or a flash memory, and may be installed from the storage medium into a storage portion such as the EEPROM of the control portion 5 or a hard disk (not shown). The present disclosure may be understood as a method of executing each processing step in the image reading process in the multifunction peripheral 10, an image reading program for causing the control portion 5 to execute each processing step in the image reading process, or a computer-readable storage medium having the image reading program stored therein.

The image reading portion 1 is an image reading portion including a document table 11, a reading unit 12, mirrors 13 and 14, an optical lens 15, a CCD (Charge Coupled Device) 16, a size detection portion 17, and the like.

The document table 11 is provided on the upper surface of the image reading portion 1, and has a document placement surface 111 and a conveyance reading surface 112. The document placement surface 111 is a transparent contact glass on which a document can be placed as an image data reading target. The conveyance reading surface 112 is a conveyance reading glass which allows transmission of light radiated from the reading unit 12 to a document conveyed by the ADF 2.

The reading unit 12 includes an LED light source 121 and a mirror 122, and is movable in a sub scanning direction 71 (right-left direction in FIG. 1A) by a movement mechanism (not shown) using a drive portion such as a stepping motor. When the reading unit 12 is moved in the sub scanning direction 71 by the drive portion, light radiated from the LED light source 121 to above the document table 11 is caused to scan in the sub scanning direction 71.

The LED light source 121 includes multiple white LEDs arranged along a main scanning direction 72 (depth direction in FIG. 1A). The LED light source 121 radiates, to a document, one line of white light along the main scanning direction 72, through the document placement surface 111 or the conveyance reading surface 112 of the document table 11. A position to which light is radiated by the LED light source 121 is a reading position for image data by the image reading portion 1. The reading position moves in the sub scanning direction 71 along with movement of the reading unit 12 in the sub scanning direction 71. Specifically, when reading image data from a document placed on the document placement surface 111, the reading unit 12 is moved to such a position that allows light from the LED light source 121 to pass through the document placement surface 111. In addition, when reading image data from a document conveyed by the ADF 2, the reading unit 12 is moved to such a position that allows light from the LED light source 121 to pass through the conveyance reading surface 112.

The mirror 122 reflects, toward the mirror 13, light reflected when the LED light source 121 radiates light to a document at the reading position. Then, the light reflected by the mirror 122 is guided into the optical lens 15 by the mirrors 13 and 14. The optical lens 15 converges incident light and causes the converged light to enter the CCD 16.

The CCD 16 is a photoelectric conversion element that converts received light into an electric signal (voltage) corresponding to the light amount and outputs the electric signal as image data. The CCD 16 inputs, to the control portion 5, as image data of the document, an electric signal based on the reflected light reflected from the document and entering the CCD 16 when the light is radiated from the LED light source 121. Thus, in the image reading portion 1, based on light reflected when light is radiated through the document placement surface 111 to a document placed on the document placement surface 111, or based on light reflected when light is radiated through the conveyance reading surface 112 to a document conveyed by the ADF 2, image data is read from the document.

The size detection portion 17 includes a plurality of optical sensors 171 to 176 provided below the document placement surface 111, as shown in FIG. 1B. The optical sensors 171 to 176 are reflection-type optical sensors provided for detecting the length in the sub scanning direction 71 (hereinafter, referred to as "sheet length") of a document placed on the document placement surface 111. Specifically, the optical sensors 171 to 176 are located at positions along the sub scanning direction 71 that correspond to sizes of B5 portrait, A4 portrait, B5 landscape, A4 landscape, B4 landscape, and A3 landscape, and each sensor detects whether or not a document is present at their respective positions. A result of detection by the size detection portion 17 is inputted to the control portion 5. Thus, the control portion 5 can detect the sheet length of a document placed on the document placement surface 111, based on the result of detection by the size detection portion 17. It is noted that the control portion 5 may determine the sheet length of the document, based on image data of the document read by the image reading portion 1. Also, the control portion 5 may set the size of a document to be read by the image reading portion 1, in accordance with a user's operation performed in advance on the operation display portion 6.

Further, the control portion 5 has a function of detecting the width in the main scanning direction 72 (hereinafter, referred to as "sheet width") of a document placed on the document placement surface 111. For example, the control portion 5 detects the width in the main scanning direction 72 of the document placed on the document placement surface 111, based on light entering the CCD 16 when the LED light source 121 is lit up at a reading start position on the document placement surface 111. It is noted that optical sensors may be provided at respective positions along the main scanning direction 72 that correspond to sheet widths of a plurality of document sizes, and the control portion 5 may determine the sheet width of the document in accordance with a result of detection by each optical sensor.

The image forming portion 3 is an electrophotographic-type image forming portion that executes image forming processing (print processing) based on image data read by the image reading portion 1 or image data inputted from an information processing device such as an external personal computer.

Specifically, the image forming portion 3 includes a photosensitive drum 31, a charging device 32, an exposure device (LSU) 33, a developing device 34, a transfer roller 35, an electricity removing device 36, a fixing roller 37, a pressure roller 38, and the like. In the image forming portion 3, an image is formed on a sheet fed from the sheet feed cassette 4 by the following procedure.

First, the photosensitive drum 31 is uniformly charged at a predetermined potential by the charging device 32. Next, light based on image data is radiated to a surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. It is noted that toner (developer) is supplied to the developing device 34 from a toner container 34A detachably connected to the image forming portion 3. Next, the toner image formed on the photosensitive drum 31 is transferred onto a sheet by the transfer roller 35. Thereafter, the toner image transferred onto the sheet is melted and fixed by being heated by the fixing roller 37 when the sheet passes between the fixing roller 37 and the pressure roller 38. It is noted that the electric potential of the photosensitive drum 31 is removed by the electricity removing device 36.

Figure 2:
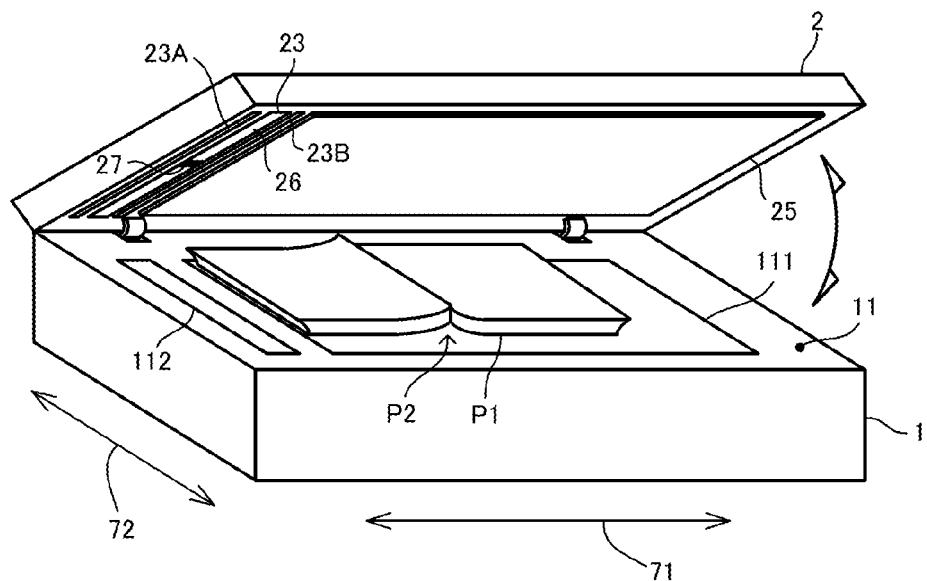
FIG. 2 is a schematic diagram showing a major part of an ADF included in the multifunction peripheral shown in FIG. 1A.

Next, the ADF 2 will be described with reference to FIG. 1A, FIG. 1B, and FIG. 2. FIG. 2 is a major part schematic diagram simply illustrating the ADF 2.

As shown in FIG. 1A and FIG. 1B, the ADF 2 is a document conveying portion including a document set portion 21, a plurality of conveyance rollers 22, a document holder 23, a sheet discharge portion 24, and the like. The document holder 23 is provided above the conveyance reading surface 112 via a space so as to allow a document to pass therebetween.

By each conveyance roller 22 being driven by a motor (not shown), the ADF 2 feeds a document on the document set portion 21 so as to pass through the reading position for image data to be read by the image reading portion 1 and then conveys the document to the sheet discharge portion 24. More specifically, in the ADF 2, as shown in FIG. 2, a document on the document set portion 21 passes through an opening 23A adjacent to the document holder 23 and then is conveyed to between the document holder 23 and the conveyance reading surface 112. Thereafter, the document passes through an opening 23B adjacent to the document holder 23 and then is conveyed to the sheet discharge portion 24. Thus, in the image reading portion 1, light can be radiated from the reading unit 12 through the conveyance reading surface 112 to a document conveyed by the ADF 2, whereby image data can be read from the document.

In addition, as shown in FIG. 2, the ADF 2 is supported in an openable and closable manner with respect to the document placement surface 111 and the conveyance reading surface 112 of the document table 11, thus also serving as a cover member for the document table 11. On the bottom surface of the ADF 2, a color reference surface 25 facing the document placement surface 111 of the document table 11, and a color reference surface 26 facing the conveyance reading surface 112 of the document table 11, are provided.

The color reference surface 25 is a white surface used for, when the image reading portion 1 reads image data from a document placed on the document placement surface 111, determining the boundary of the document, for example. The color reference surface 26 is the bottom surface of the document holder 23, and is a white surface used for, when the image reading portion 1 reads image data from a document conveyed to the conveyance reading surface 112, determining the boundary of the document, for example. In addition, the control portion 5 executes various image processes such as shading correction and gamma correction, based on white image data read from the color reference surface 25, for example.

On the color reference surface 26, a predetermined black partial region 27 is provided whose color is different from white, the ground color of the color reference surface 26. The shape of the partial region 27 is a rectangular shape as shown in FIG. 2, for example. It is noted that the shape of the partial region 27 may be a circle or a line, for example. In addition, the partial region 27 is not limited to black which has a high density, but may be a colored region having a predetermined density such as gray that is different from the ground color of the color reference surface 26. Specifically, the partial region 27 may have such a predetermined color that, on image data read from the color reference surface 26, a density difference between the ground color of the color reference surface 26 and the color of the partial region 27 varies depending on the degree in which the ADF 2 is opened or closed.

The partial region 27 is located at a position corresponding to inside of the range of the minimum size of a document that can be conveyed by the ADF 2. Specifically, in the case where the ADF 2 is configured to convey a document in a centered manner, as shown in FIG. 2, the partial region 27 is located at a position corresponding to a central portion in a sheet width direction of the document conveyed by the ADF 2. Thus, when image data is read from the document by using the ADF 2, the partial region 27 is hidden by the document and therefore the partial region 27 is not read as image data of the document. It is noted that in the case where the ADF 2 is configured to convey a document in a top-aligned manner or a bottom-aligned manner, the partial region 27 is located at a position corresponding to the upper end or the lower end in the sheet width direction of the document conveyed by the ADF 2.

In the multifunction peripheral 10, since the partial region 27 is provided on the color reference surface 26, a white surface used for reading white reference data is provided, on the reverse-side surface of the document table 11, in a region between the document placement surface 111 and the conveyance reading surface 112. Thus, when the image reading portion 1 reads image data from a document conveyed to the conveyance reading surface 112, the control portion 5 can execute various image processes such as shading correction and gamma correction based on white image data read from the white surface. As a matter of course, on the color reference surface 26, the partial region 27 may be located at such a position that is outside the range of the maximum size of a document that can be conveyed by the ADF 2 and allows reading by the image reading portion 1. In this case, the control portion 5 can execute various image processes such as shading correction and gamma correction based on white image data read from the color reference surface 26, for example.

In the present embodiment, the case where the partial region 27 is provided on the color reference surface 26 facing the conveyance reading surface 112 will be described as an example. In another embodiment, the partial region 27 may be provided on the color reference surface 25 facing the document placement surface 111. In this case, the partial region 27 is provided at such a position that allows reading by the image reading portion 1 and is outside the range of the predetermined maximum size of a document that allows reading by using the document placement surface 111. In addition, in this case, the multifunction peripheral 10 may have, instead of the ADF 2, a cover member that is openable and closable with respect to the document placement surface 111, and the color reference surface 25 and the partial region 27 may be provided on this cover member.

Figure 3:
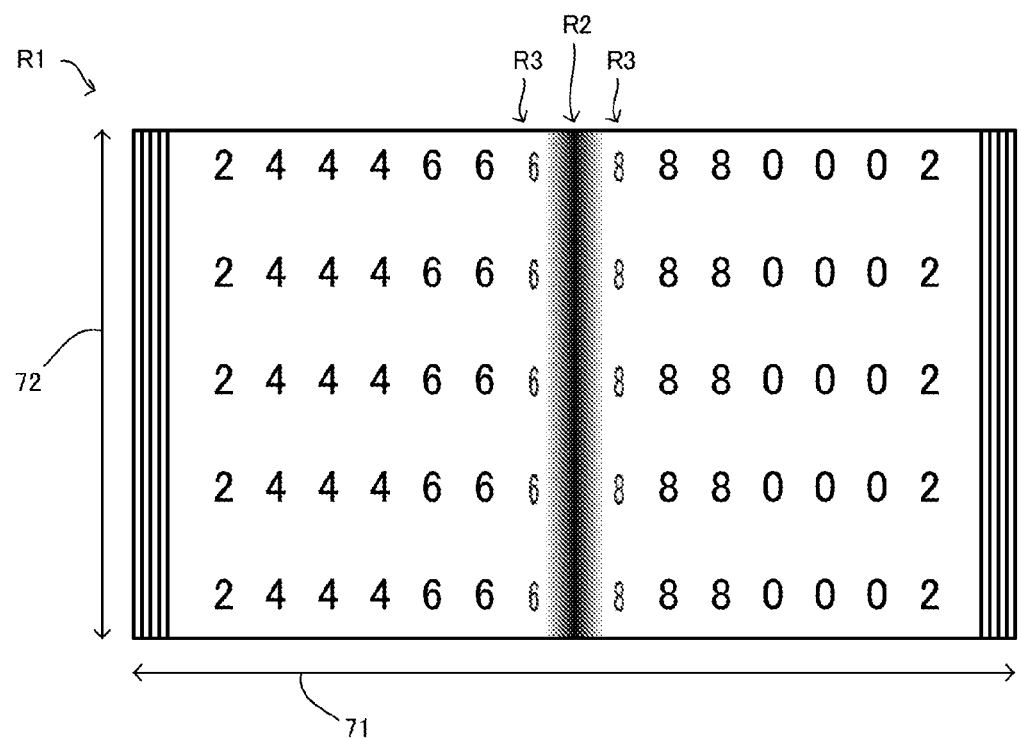
FIG. 3 is a diagram showing an example of document image data read by the multifunction peripheral shown in FIG. 1A.

In the multifunction peripheral 10, as shown in FIG. 2, when image data is read from a thick book document P1 such as a book formed by a plurality of sheets bound at the center, lifting occurs at a central portion P2 of the book document P1 placed on the document placement surface 111. In this case, as shown in FIG. 3, in document image data R1 read from the book document P1 by the image reading portion 1, a black belt-like image R2 appears at the central portion P2 of the book document P1. In addition, as shown in FIG. 3, in the document image data R1, a character image R3 positioned at the central portion P2 is reduced in the sub scanning direction 71.

Considering this, there is known an image processing device that has a special sensor for detecting the height of the central portion of a book document placed on the document placement surface 111, and that converts a black belt-like image in image data into a white image in accordance with a result of detection by the sensor. However, in such a configuration, since it is necessary to newly provide the special sensor for detecting the height of the central portion of a book document placed on the document placement surface 111, a problem of increase in the number of components and the cost arises.

In addition, there is known an image reading device that has a shape detection portion for acquiring an image of a top or a bottom of a book document based on light reflected when light is radiated to either one of a top end or a bottom end of the book document by using a reflection mirror. As the shape detection portion, there is also known a configuration using a contactor that varies while contacting an end portion of a book document or an optical system for distance measurement, for example. This type of image reading device can correct distortion of image data read from a book document in accordance with a result of detection by the shape detection portion. However, in such a configuration, since it is necessary to newly provide a member such as the reflection mirror, the contactor, or the optical system, a problem of increase in the number of components and the cost arises.

Considering this, in the multifunction peripheral 10, the control portion 5 executes the image reading process (see FIG. 4) described later. Thus, in the multifunction peripheral 10, when a document placed on the document placement surface 111 is a book document, the density of a black belt-like image occurring at the central portion of document image data read from the book document is suppressed. That is, the multifunction peripheral 10 can suppress the density of a belt-like image occurring in document image data read from the book document, without using a special sensor for detecting the height of the central portion of the book document. In addition, in the image reading process, the control portion 5 suppresses distortion of an image at the central portion of document image data read from the book document. That is, the multifunction peripheral 10 can suppress distortion of an image occurring in document image data read from the central portion of the book document, without using a special sensor for detecting the height of the central portion of the book document.

<Image Reading Process>

Figure 4:
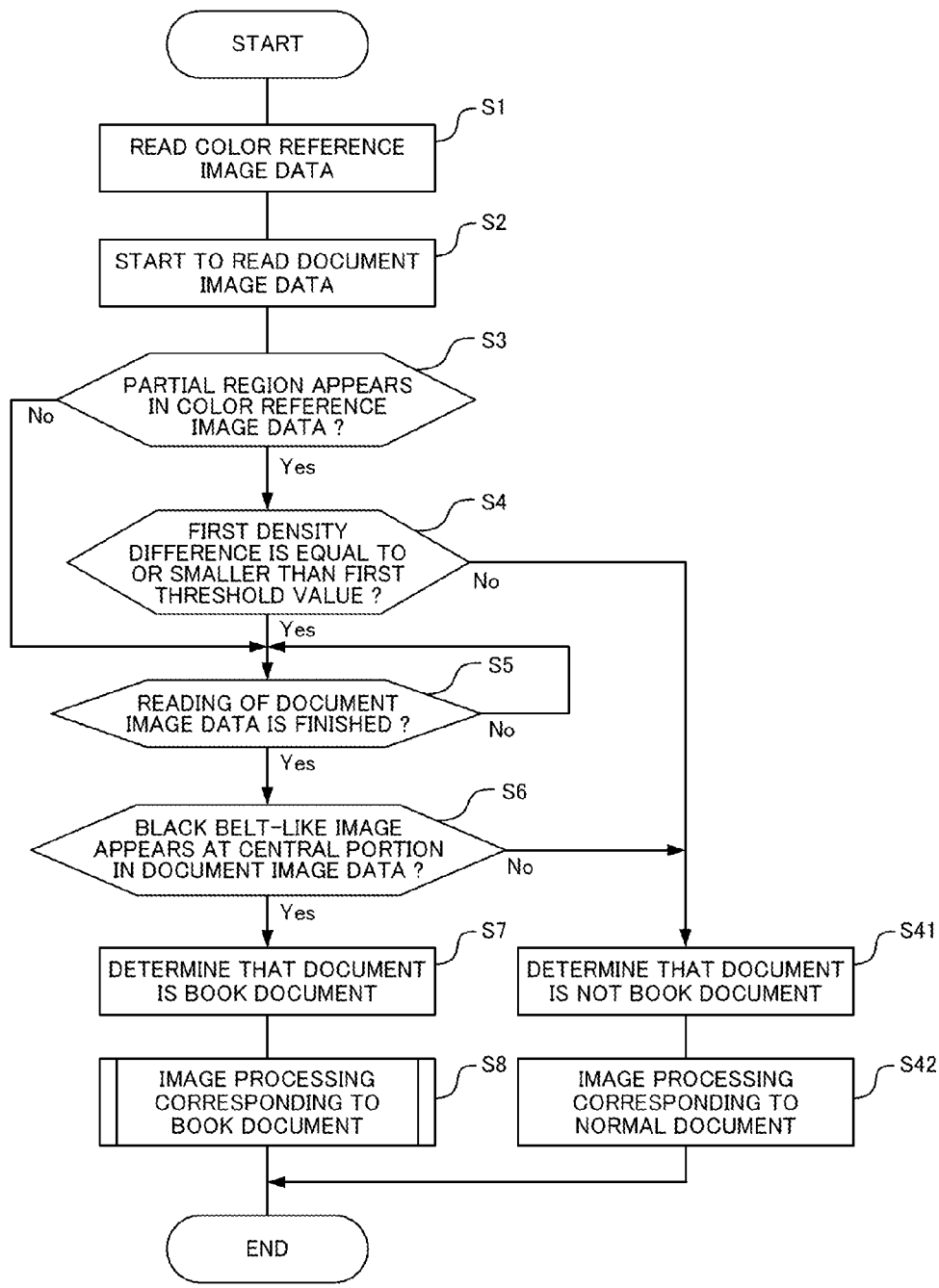
FIG. 4 is a flowchart showing an example of the procedure of an image reading process executed by the multifunction peripheral shown in FIG. 1A.

Hereinafter, an example of the procedure of the image reading process executed by the control portion 5 will be described with reference to FIG. 4. Here, steps S1, S2, . . . denote identification numbers of the processing steps executed by the control portion 5.

In the state where a document is placed on the document placement surface 111, when an image reading start operation to the operation display portion 6 is performed or when an image reading start request is received from an information processing device such as a personal computer, the image reading process is executed by the control portion 5. It is noted that an image reading process performed by using the ADF 2 is the same as a conventional one, so the description thereof is omitted.

[Step S1]

First, in step S1, the control portion 5 executes image reading processing of reading image data from the color reference surface 26 facing the conveyance reading surface 112 by the image reading portion 1. The image data read from the color reference surface 26 contains ground image data of the color reference surface 26 and image data of the partial region 27. Here, step S1 corresponds to a reading control step, and the control portion 5 when executing step S1 corresponds to a reading control portion.

Specifically, the control portion 5 moves the reading unit 12 so that the reading position of the image reading portion 1 will be positioned at the conveyance reading surface 112. It is noted that in the case where the standby position (home position) of the reading unit 12 is a position that allows image data to be read through the conveyance reading surface 112, the control portion 5 need not move the reading unit 12. Then, the control portion 5 causes the reading unit 12 to radiate light to the color reference surface 26, thereby reading image data from the color reference surface 26. At this time, the image reading portion 1 reads image data corresponding to one line along the main scanning direction 72 from the color reference surface 26, for example. Hereinafter, image data read from the color reference surface 26 is referred to as color reference image data.

[Step S2]

After the image reading processing in step S1 is finished, in subsequent step S2, the control portion 5 starts image reading processing of reading image data from the document placed on the document placement surface 111 by the image reading portion 1.

Specifically, the control portion 5 moves the reading unit 12 so that the reading position of the image reading portion 1 will be positioned at the reading start position of the document placement surface 111. Then, the control portion 5 causes the reading unit 12 to radiate light to the document placed on the document placement surface 111 while moving the reading unit 12 in the sub scanning direction 71, thereby reading image data from the document. Hereinafter, the image data read from the document is referred to as document image data.

[Step S3]

Next, in step S3, the control portion 5 determines whether or not the partial region 27 appears in the color reference image data read in step S1. Specifically, in the state where the ADF 2 is opened, light radiated from the reading unit 12 is not reflected by the color reference surface 26, and therefore the color reference image data becomes a substantially uniform black image, so that the density difference between the maximum density and the minimum density decreases. Therefore, if the density difference between the maximum density and the minimum density in the color reference image data is equal to or greater than a predetermined lower limit value, the control portion 5 determines that the partial region 27 appears. That is, in step S3, whether or not the ADF 2 is opened is determined in accordance with whether or not the partial region 27 appears.

In step S3, if the control portion 5 determines that the partial region 27 appears (Yes in S3), the control portion 5 shifts the process to step S4. On the other hand, in step S3, if the control portion 5 determines that the partial region 27 does not appear (No in S3), the control portion 5 determines that the ADF 2 is opened, and shifts the process to step S5.

[Step S4]

In step S4, the control portion 5 determines whether or not a first density difference which is the density difference between the density of the partial region 27 and the ground density of the color reference surface 26 in the color reference image data read in step S1 is equal to or smaller than a predetermined first threshold value.

For example, the control portion 5 calculates, as the first density difference, the density difference between the maximum density and the minimum density in the color reference image data. It is noted that in the multifunction peripheral 10, the position of the partial region 27 on the color reference surface 26 is generally known. Therefore, the control portion 5 may calculate, as the first density difference, the density difference between the average value in image data corresponding to the partial region 27 and the average value in image data corresponding to the other region.

Here, the first threshold value is a value set in advance as an index for determining the opening degree of the ADF 2. For example, the first threshold value is a value obtained by an experiment or a simulation as the density difference between the density of the partial region 27 and the ground density of the color reference surface 26 in the color reference image data read when the opening degree of the ADF 2 is 20 degrees. Thus, in step S4, the control portion 5 can determine whether or not a book document that causes the ADF 2 to be opened by 20 degrees or more is placed on the document placement surface 111. It is noted that the opening degree of the ADF 2 for determining whether or not a document is a book document may be freely set in advance at 10 degrees, 30 degrees, or the like.

Then, in step S4, if the control portion 5 determines that the first density difference is equal to or smaller than the first threshold value (Yes in S4), the control portion 5 shifts the process to step S5. On the other hand, in step S4, if the control portion 5 determines that the first density difference is greater than the first threshold value (No in S4), the control portion 5 shifts the process to step S41.

Figure 5A:
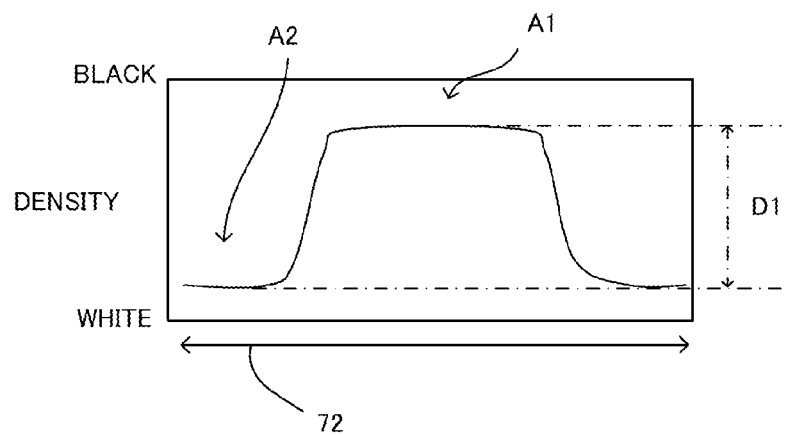
FIG. 5A, FIG. 5B, and FIG. 5C are diagrams showing examples of a result of density reading in a partial region by the multifunction peripheral shown in FIG. 1A.
Figure 5B:
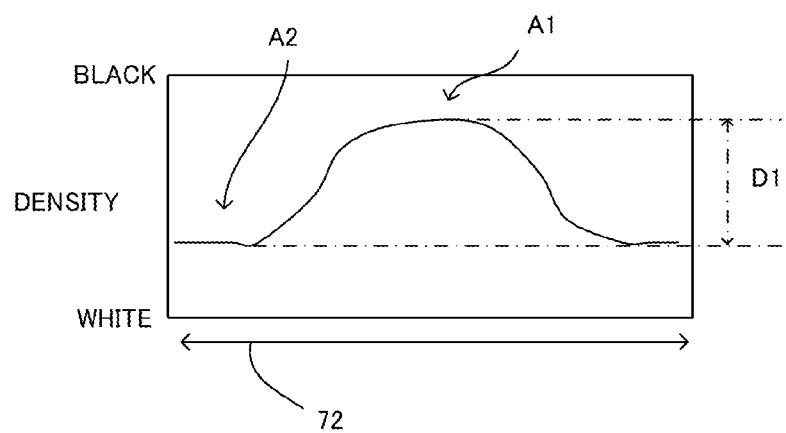
Figure 5C:
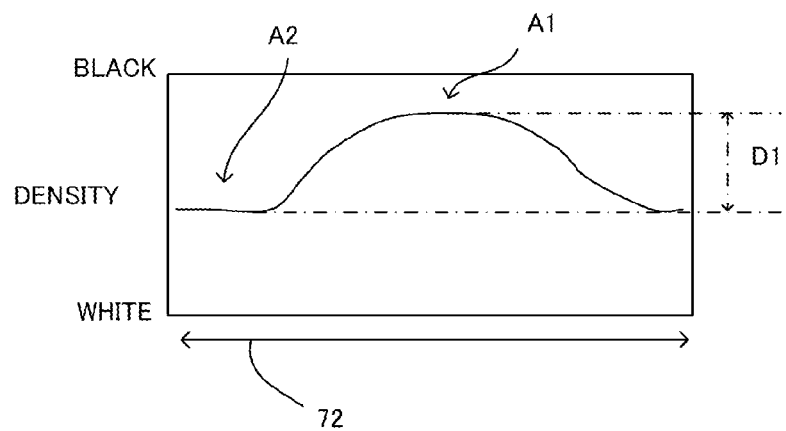

Here, FIG. 5A, FIG. 5B, and FIG. 5C are diagrams each showing a part of the color reference image data read in step S1. Specifically, FIG. 5A is an example of the color reference image data read when the ADF 2 is closed, FIG. 5B is an example of the color reference image data read when the ADF 2 is slightly opened, and FIG. 5C is an example of the color reference image data read when the ADF 2 is largely opened.

As shown in FIG. 5A, when the ADF 2 is closed, a density difference D1 (an example of the first density difference) between a region A1 corresponding to the partial region 27 and a region A2 corresponding to the ground of the color reference surface 26 in the color reference image data, is great. On the other hand, when the ADF 2 is slightly opened, the density difference D1 reduces as shown in FIG. 5B, and further, when the ADF 2 is largely opened, the density difference D1 further reduces as shown in FIG. 5C. Therefore, the control portion 5 can determine the opening degree of the ADF 2 by determining whether or not the value of the density difference D1 is equal to or smaller than the first threshold value as described above, and thus can determine whether or not the document placed on the document placement surface 111 is a thick book document.

Thus, in the multifunction peripheral 10, the first density difference which is the density difference between the ground density of the color reference portion 26 and the density of the partial region 27 is used as a determination index for determining whether or not the document is a book document. Therefore, even in a use environment in which there is an influence of disturbance light such as sunlight or indoor illumination, it is possible to determine the opening degree of the ADF 2 without being influenced by the disturbance light.

[Steps S41 to S42]

If the first density difference is greater than the first threshold value, in subsequent step S41, the control portion 5 determines that the document placed on the document placement surface 111 is not a book document. Then, in step S42, the control portion 5 executes conventionally-known image processing corresponding to a normal document that is not a book document. It is noted that this image processing is, for example, shading correction, gamma correction, or the like performed for the document image data.

[Step S5]

On the other hand, if the first density difference is equal to or smaller than the first threshold value, in subsequent step S5, the control portion 5 waits until the image reading processing for the document image data started in step S2 is finished (No in S5). Then, after the image reading processing is finished (Yes in S5), the control portion 5 shifts the process to step S6.

[Step S6]

Figure 6A:
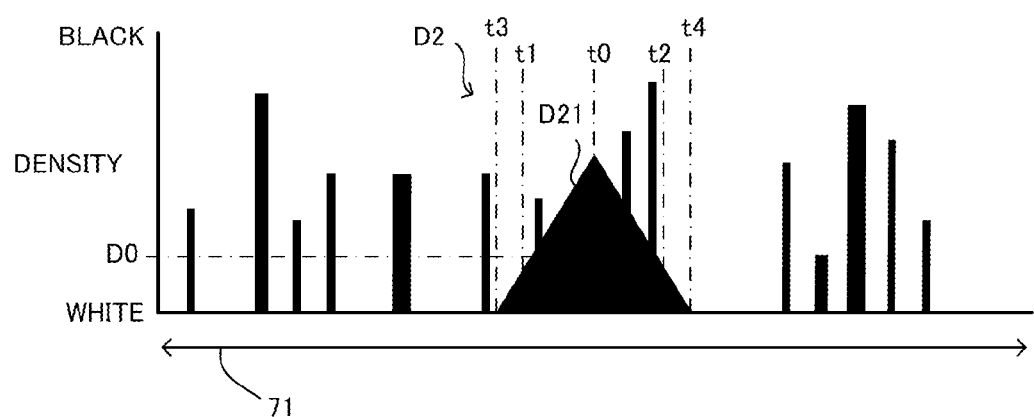
FIG. 6A and FIG. 6B are diagrams showing examples of a result of execution of the image reading process executed by the multifunction peripheral shown in FIG. 1A.

In step S6, based on the document image data, the control portion 5 determines whether or not a predetermined black belt-like image appears in the document image data. For example, the control portion 5 averages the document image data on a one-line basis along the main scanning direction 72, thereby generating averaged data. Here, FIG. 6A is a diagram showing an example of the averaged data. As shown in FIG. 6A, in the averaged data of the document image data containing the black belt-like image, lines having a density equal to or greater than the high-density value appear continuously in the sub scanning direction 71 in a region D2 corresponding to the central portion of the book document. Therefore, when a predetermined number or more of lines having a density equal to or greater than the predetermined high-density value appear continuously in the averaged data, the control portion 5 can determine that a black belt-like image appears in the document image data.

In addition, the control portion 5 can also determine that a black belt-like image appears when a predetermined number or more of lines having a density equal to or greater than the predetermined high-density value appear in a specific range set in advance as the range of the region D2 in the averaged data. Specifically, the control portion 5 can determine the length in the sub scanning direction 71 of a document in accordance with the document size detected by the size detection portion 17. Besides, the control portion 5 can also determine the length in the sub scanning direction 71 of a document by detecting the position of an end in the sub scanning direction 71 in the document image data. Therefore, the specific range may be a range corresponding to a predetermined number of lines at both sides in the sub scanning direction 71 with reference to the center of the length of the document in the sub scanning direction 71. In addition, a target to be averaged in the document image data in step S6 may be only the specific range in the sub scanning direction 71 of the document image data. In this case, when the specific range of the document image data is read, the control portion 5 may execute the processing of step S6 in parallel with the image reading processing. Further, the control portion 5 may change the specific range to a narrower range or a broader range in accordance with the length in the sub scanning direction 71 of a sheet corresponding to a document size detected by the size detection portion 17.

Then, if the control portion 5 determines in step S6 that a black belt-like image appears in the document image data (Yes in S6), the control portion 5 shifts the process to step S7. On the other hand, if the control portion 5 determines in step S6 that a black belt-like image does not appear in the document image data (No in S6), the control portion 5 shifts the process to step S41.

[Step S7]

In step S7, the control portion 5 determines that the document placed on the document placement surface 111 is a book document. That is, in the image reading processing, if the first density difference is equal to or smaller than the first threshold value and a black belt-like image appears in the document image data, the control portion 5 determines that the document placed on the document placement surface 111 is a book document. Here, such processing corresponds to a document determination step, and the control portion 5 when executing such processing corresponds to a document determination portion.

In another embodiment, the control portion 5 may skip the processing of step S6 and determine that the document is a book document if the first density difference is equal to or smaller than the first threshold value in step S4. Such processing is also an example of the document determination step, and the control portion 5 when executing such processing is also an example of the document determination portion.

[Step S8]

Then, in step S8, the control portion 5 executes, in addition to normal image processing as in step S42, image processing for book document set in advance so as to correspond to a book document. Specifically, in step S8, the control portion 5 executes density correction processing of correcting the density at the central portion in the document image data, and enlargement correction processing of enlarging an image at the central portion in the document image data in a predetermined direction.

<Density Correction Processing and Enlargement Correction Processing>

Hereinafter, with reference to a flowchart in FIG. 7, an example of the density correction processing and the enlargement correction processing executed by the control portion 5 in step S8 will be described. Here, steps S81, S82, . . . denote identification numbers of the processing steps executed by the control portion 5.

Figure 7:
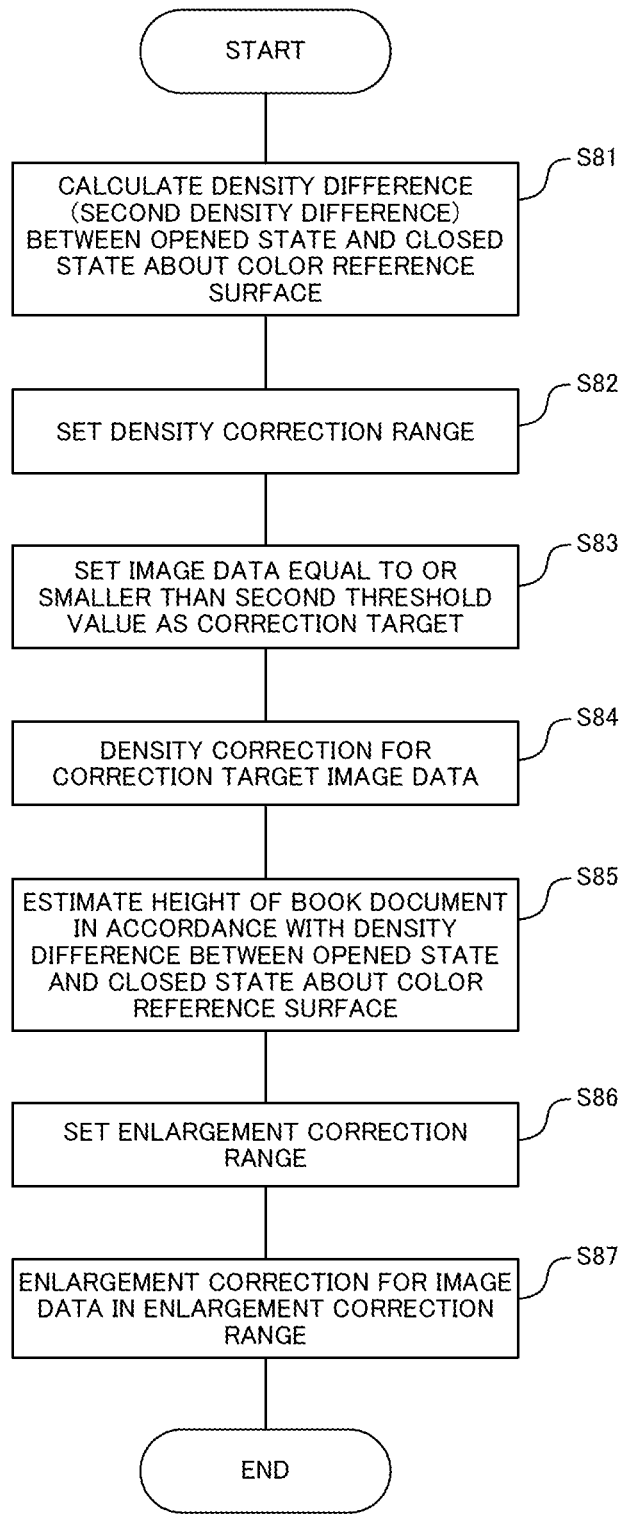
FIG. 7 is a flowchart showing an example of the procedure of image processing for book document executed by the multifunction peripheral shown in FIG. 1A.

First, in steps S81 to S84 shown in FIG. 7, the control portion 5 executes density correction processing to correct the density in a specific density correction range at the central portion in the document image data, thereby suppressing the density of a black belt-like image occurring in the document image data. It is noted that the density correction range is a range set in advance for individual multifunction peripherals 10, a range set in accordance with a user's operation on the operation display portion 6 for individual documents read by the image reading portion 1 in the multifunction peripheral 10, or a range automatically set by the control portion 5 in accordance with the size of the document or the like. Particularly, as described below, the control portion 5 corrects the density in the density correction range, based on the density of the color reference surface 26 read in step S1 and the density of the color reference surface 26 read by the image reading portion 1 when the ADF 2 is closed. Here, the density correction processing corresponds to a density correction step, and the control portion 5 when executing the density correction processing corresponds to a density correction portion. Thus, in the multifunction peripheral 10, since the density in the density correction range is corrected based on the density of the color reference surface 26 which changes depending on the opening degree of the ADF 2, proper correction can be performed in accordance with the height of lifting at the central portion of the book document.

[Step S81]

Specifically, in step S81, the control portion 5 calculates a second density difference which is the density difference between an opened state and a closed state about the color reference surface 26 read by the image reading portion 1. That is, the control portion 5 calculates, as the second density difference, the density difference between the density of the color reference surface 26 read in step S1 when the book document is placed on the document placement surface 111, and the density of the color reference surface 26 read by the image reading portion 1 when the ADF 2 is closed. It is noted that the state in which the ADF 2 is closed means that the ADF 2 is closed with no book document placed on the document placement surface 111. For example, the density of the color reference surface 26 when the ADF 2 is closed may be read in advance from the color reference surface 26 by the image reading portion 1 when the ADF 2 is closed, and may be stored in advance in a storage portion such as the EEPROM of the control portion 5. It is noted that the density of the color reference surface 26 is, for example, an average value of the entire color reference image data including image data of the partial region 27. Alternatively, the density of the color reference surface 26 may be an average value of the density of a part or the entirety of a ground portion of the color reference surface 26 excluding the partial region 27, in the color reference image data.

When the multifunction peripheral 10 is powered on or returns from a sleep mode, the control portion 5 may read the density of the color reference surface 26 by the image reading portion 1 with the ADF 2 being closed, and store the density into a storage portion such as the EEPROM. At this time, the control portion 5 may determine whether or not the ADF 2 is closed, in accordance with a result of detection by a micro switch or the like (not shown) for detecting opening or closing of the ADF 2. In addition, the control portion 5 may determine that the ADF 2 is closed if the density of the color reference image data read by the image reading portion 1 is equal to or smaller than an upper limit value set in advance as an index for detecting that the ADF 2 is closed.

Further, when the multifunction peripheral 10 is powered on or returns from a sleep mode, the control portion 5 may detect whether or not a book document is placed on the document placement surface 111, and only when a book document is not placed on the document placement surface 111, the control portion 5 may read the density of the color reference surface 26 by the image reading portion 1 and store the density into a storage portion such as the EEPROM. Specifically, the multifunction peripheral 10 may have a sensor such as an optical sensor or a micro switch capable of detecting that the ADF 2 is more closed as compared to an opening amount set in advance for determining that a book document is placed on the document placement surface 111. Thus, the density of the color reference surface 26 read when a book document is not placed on the document placement surface 111 and the ADF 2 is closed is stored into the storage portion. As another method for detecting whether or not a book document is placed on the document placement surface 111, the control portion 5 may cause the image reading portion 1 to read the color reference image data from the color reference surface 26, as in step S1. In this case, the control portion 5 can detect whether or not a book document is placed on the document placement surface 111, in accordance with whether or not the first density difference which is the density difference between the density of the partial region 27 and the ground density of the color reference surface 26 in the color reference image data is equal to or smaller than the first threshold value. It is noted that the control portion 5 when executing processing for detecting whether or not a book document is placed on the document placement surface 111 is an example of a book document detection portion.

[Step S82]

Next, in step S82, the control portion 5 sets a density correction range at the central portion in the document image data. Specifically, the control portion 5 sets, as the density correction range, a region where the black belt-like image detected in step S6 is formed and a predetermined outside region adjacent to the region. The predetermined region is a region where a belt-like image having a lower density than the belt-like image detected in step S6 is assumed to be left.

For example, the case where in step S6, the density in a region between a line t1 and a line t2, centered on a line t0, shown in FIG. 6A, is determined to be equal to or greater than the predetermined high-density value, will be considered. In this case, the control portion 5 may set, as the density correction range, a region between the line t1 and the line t2, a region from the line t1 to a line t3 which is separated outward by a predetermined amount from the line t1, and a region from the line t2 to a line t4 which is separated outward by a predetermined amount from the line t2. For example, the predetermined amount may be set in advance so as to correspond to a region where a black belt-like image at the central portion can be left, based on a result of experiment or simulation. It is noted that the density correction range may be a constant value set in advance.

Further, the control portion 5 may change the density correction range in accordance with the first density difference or the second density difference. Specifically, the control portion 5 may change the density correction range such that the density correction range becomes broader as the first density difference or the second density difference becomes greater and the opening degree of the ADF 2 becomes greater, and the density correction range becomes narrower as the first density difference or the second density difference becomes smaller and the opening degree of the ADF 2 becomes smaller.

[Step S83]

Next, in step S83, the control portion 5 sets, as a correction target, only image data having a density equal to or smaller than a predetermined second threshold value, of image data included in the density correction range set in step S82. It is noted that the control portion 5 may set, as the second threshold value, the second density difference calculated in step S81. As a result, it becomes possible to change the second threshold value appropriately in accordance with the opening degree of the ADF 2. It is noted that the second threshold value may be a value that is equal to or greater than the second density difference and is equal to or smaller than a predetermined upper limit value. For example, the control portion 5 may set, as the second threshold value, a value obtained by adding an additional value set in advance based on a result of experiment or simulation to the second density difference.

At the central portion of the book document, the lifting amount decreases with separation from the center outward in the sub scanning direction 71, and along with this, the density of a belt-like image caused by the lifting in the document image data reduces. Therefore, the control portion 5 may decrease the second threshold value which is an index for determining whether or not image data is a correction target, as the distance from the center of the central portion in the document image data increases. That is, the control portion 5 determines whether or not image data is a correction target, using, as a determination index, the second threshold value that decreases from inside to outside in the density correction range, thus enhancing the accuracy for excluding image data corresponding to the original image of a book document from a density correction target.

[Step S84]

Then, in step S84, the control portion 5 executes density correction to correct image data in the density correction range, based on the second density difference. Specifically, the control portion 5 corrects the density of image data set as a correction target in step S83 in the density correction range in accordance with the following expression (1). Here, a line number at a correction target position in the case where the center of the density correction range is set as an origin is set at n, image data at the line number n before correction is set at Y(n), image data at the line number n after correction is set at Y(n'), the second density difference is set at A, and the total number of lines included in the density correction range is set at N. It is noted that in the present embodiment, the value of density of white in the image data is "0" and the value of density of black is "255". In another embodiment, in the following expression (1), the value A which is the second density difference may be multiplied by a predetermined constant a that indicates the relationship between the second density difference and the density of the black belt-like image.

$$Y(n')=Y(n)-A\times(N-|n|)/N \qquad (1)$$

Thus, in the document image data, the density of the black belt-like image is suppressed and comes close to white, so that the black belt-like image becomes inconspicuous. Particularly, the control portion 5 calculates a correction amount for image data at the central portion by "$A\times(N-|n|)/N$". Therefore, the control portion 5 is to correct the correction target data such that the correction amount of density for image data in the density correction range gradually decreases as the distance from the center of the density correction range increases. In other words, the control portion 5 gradually increases the correction amount of density for image data in the density correction range, as approaching the center of the density correction range. That is, the control portion 5 corrects image data by a correction amount that decreases from inside to outside in the density correction range. Therefore, it becomes possible to effectively suppress the density of the black belt-like image whose density increases as approaching the center of the central portion, in accordance with the position thereof. In addition, since density correction is not executed for, of image data in the density correction range, image data having a density equal to or smaller than the second threshold value, an original image at the central portion of the book document can be kept. It is noted that in the multifunction peripheral 10, in the case where the value of density of white in the image data is "255" and the value of density of black is "0", the following expression (11) may be used.

$$Y(n')=Y(n)+A\times(N-|n|)/N \qquad (11)$$

Figure 6B:
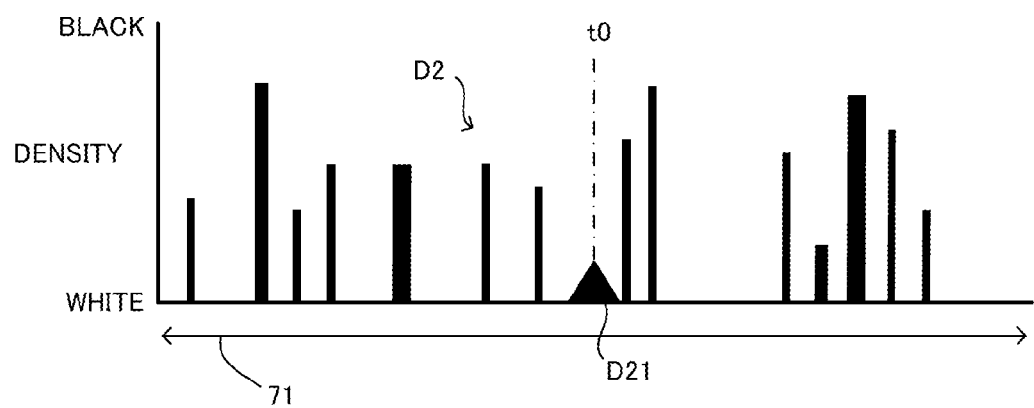

Here, FIG. 6B is a diagram showing an example of an execution result of the density correction in step S84. As shown in FIG. 6B, in the document image data after the density correction processing, the density of a black belt-like image D21 in the region D2 of the document image data is suppressed. In addition, since the correction target in the density correction range is limited in step S83, image data corresponding to an original image of the book document is left without being removed, in the document image data after the density correction processing.

If the entire black belt-like image is removed, the boundary between spread pages of the book document becomes obscure. Therefore, when the control portion 5 removes the black belt-like image, in order that a border line is left at the center (position of line number n=0) of the central portion in the document image data, the control portion 5 may exclude image data at the center from the correction target. As a result, the boundary between spread pages remains clear in the document image data after correction.

In the present embodiment, since the case where the density of the black belt-like image linearly reduces as the distance from the center position in the document image data increases will be described as an example, the correction amount of density correction in the above expression (1) linearly varies. On the other hand, the lifting portion at the central portion of the book document may have a curved shape, and therefore the density of the black belt-like image may reduce in a curved manner as the distance from the center in the document image data increases. At this time, the curve may be approximate to a curve formed by exponential function or logarithmic function, for example. Accordingly, the control portion 5 may change the correction amount of density correction in step S84, based on an exponential function or a logarithmic function set in advance. That is, the control portion 5 may correct the density in the density correction range such that the correction amount decreases based on the exponential function or the logarithmic function as the distance from the center of the central portion increases. It is noted that the exponential function or the logarithmic function may be set based on a result obtained by an experiment or a simulation performed in advance, for example.

As described above, in the multifunction peripheral 10, the control portion 5 determines whether or not a document placed on the document placement surface 111 is a book document, based on image data read by the image reading portion 1. Then, if the control portion 5 determines that a document placed on the document placement surface 111 is a book document, the control portion 5 executes density correction processing based on the second density difference which serves as an index of the opening degree of the ADF 2 and also serves as an index of the height of lifting at the central portion of the book document. Therefore, the multifunction peripheral 10 does not need a special sensor or the like for determining whether or not the document is a book document and for detecting the height or the like of lifting at the central portion of the book document. Thus, the number of components and the cost of the multifunction peripheral 10 can be reduced.

[Step S85]

Further, in subsequent steps S85 to S87, the control portion 5 executes enlargement correction processing of enlarging an image in a specific enlargement correction range at the central portion in the document image data, based on the second density difference. Here, the control portion 5 when executing the enlargement correction processing corresponds to an enlargement correction portion. It is noted that the enlargement correction range is a range set in advance for individual multifunction peripherals 10, a range set in accordance with a user's operation on the operation display portion 6 for individual documents read by the image reading portion 1 in the multifunction peripheral 10, or a range automatically set by the control portion 5 in accordance with the size of the document or the like.

First, in step S85, the control portion 5 estimates the height of lifting at the central portion of the book document placed on the document placement surface 111, based on the second density difference. Here, the control portion 5 when executing step S85 corresponds to a height estimation portion. Specifically, the opening degree of the ADF 2 can be estimated based on the second density difference, and the height of lifting at the central portion of the book document placed on the document placement surface 111 can be estimated based on the opening degree of the ADF 2. Therefore, the height of lifting can be estimated based on the second density difference. Accordingly, for example, the control portion 5 can calculate the height of lifting at the central portion of the book document by substituting the second density difference into a predetermined calculation expression representing the relationship between the second density difference and the height of lifting at the central portion of the book document. It is noted that the predetermined calculation expression may be set in advance based on the correspondence relationship between change in the opening degree of the ADF 2 and change in the second density difference obtained by an experiment or a simulation performed in advance. The control portion 5 may estimate the height of lifting at the central portion of the book document placed on the document placement surface 111, based on the first density difference.

[Step S86]

Next, in step S86, the control portion 5 sets an enlargement correction range at the central portion in the document image data in accordance with the height of lifting of the book document estimated based on the second density difference in step S85. That is, the control portion 5 sets the enlargement correction range based on the second density difference.

Figure 8A:
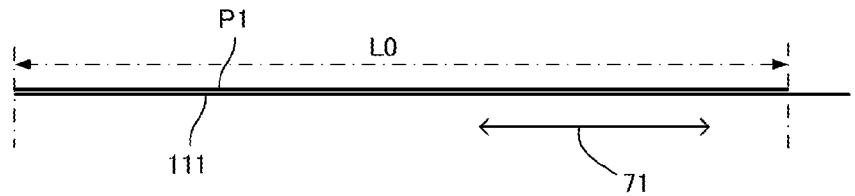
FIG. 8A and FIG. 8B are schematic diagrams showing examples of a reading situation of a book document in the multifunction peripheral shown in FIG. 1A.
Figure 8B:
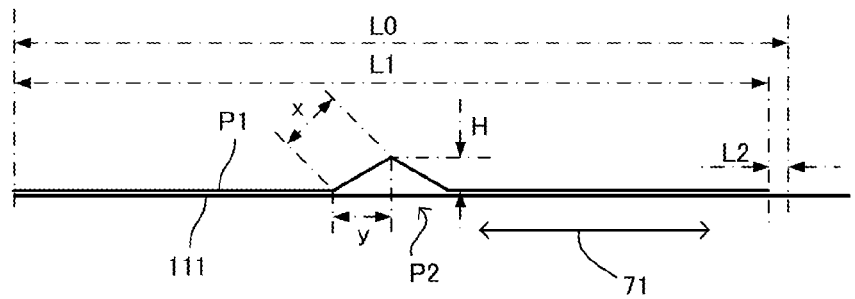

Here, FIG. 8A is a diagram schematically showing an original length L0 in the sub scanning direction 71 of the book document P1, and FIG. 8B is a diagram showing an actual length L1 in the sub scanning direction 71 of the book document P1. As shown in FIG. 8B, when the book document P1 is placed on the document placement surface 111, lifting occurs at the central portion P2 of the book document P1. Therefore, the length L1 in the sub scanning direction 71 of spread pages of the book document P1 as a reading target for image data by the image reading portion 1 is, as a whole, shorter by a length L2 than the original length L0 of spread pages of the book document P1.

Here, the control portion 5 can specify the original length L0 of spread pages of the book document P1, based on a result of detection by the size detection portion 17. For example, when a document is detected by the optical sensor 174 of the size detection portion 17 but is not detected by the optical sensor 175, the control portion 5 determines that the size of the book document P1 is A4 landscape corresponding to the optical sensor 174. Then, the control portion 5 specifies the length in the sub scanning direction 71 corresponding to A4 landscape as the original length L0 in the sub scanning direction 71 of the book document P1. Besides the automatic size detection method using the size detection portion 17, for example, in the case where the size of the book document P1 is set on the operation display portion 6 by a user, the control portion 5 specifies the length in the sub scanning direction 71 corresponding to the set size as the original length L0 in the sub scanning direction 71 of the book document P1. In addition, the control portion 5 may determine, as the original sheet size of the book document P1, a sheet size that is equal to or larger than a size corresponding to the document image data and is closest to the size among a plurality of sheet sizes (A4, A5, B5, etc.) set in advance.

On the other hand, the control portion 5 can specify the length L1 in the sub scanning direction 71 of the book document P1 by detecting an end in the sub scanning direction 71 based on the document image data. For example, when the book document P1 is placed on the document placement surface 111, the document image data contains a plurality of line images at an outer side in the sub scanning direction 71 of the book document P1. Therefore, the control portion 5 may detect the position of the innermost line among the line images as an end of the book document P1. It is noted that various conventional techniques can be used as a detection method for an end of the document in the document image data. Then, the control portion 5 calculates the difference between the length L1 and the length L0, thereby acquiring the length L2 corresponding to the reduction width of the book document P1. Here, the control portion 5 when executing the acquisition processing corresponds to a difference acquiring portion.

Here, as shown in FIG. 8B, if the height of lifting at the central portion P2 of the book document P1 estimated in step S85 is set at H, the length of the hypotenuse of a triangle space formed by the lifting at the central portion P2 is set at x, and the half of the length of the base is set at y, the following expressions (2) and (3) are satisfied.

$$x-y=(L2/2) \quad (2)$$

$$H^2+y^2=x^2 \quad (3)$$

Then, the following expressions (4) and (5) are derived from the above expressions (2) and (3).

$$x=(H^2+(L2/2)^2)/L2 \quad (4)$$

$$y=(H^2-(L2/2)^2)/L2 \quad (5)$$

That is, the length x of the hypotenuse and the half length y of the base of the space formed by the lifting at the central portion P2 can be calculated based on the height H of the lifting at the central portion P2 of the book document P1 and the length L2 which is the reduction width of the book document P1. In the document image data read from the book document P1, a range (2−y) including regions with a length of y at both sides of the center of the length L1 in the sub scanning direction 71 is a region reduced by a length of 2·(x−y) from the original length 2·x. Therefore, in step S86, the control portion 5 sets, as the enlargement correction range which is a target of enlargement correction, ranges with a length of y at both sides, using the center of the length L1 as an origin.

It is noted that the center of lifting at the central portion of the book document may be deviated. Therefore, for example, the control portion 5 may use, as an origin, a line having the highest density in the black belt-like image occurring at the central portion of the book document P1, and set, as the enlargement correction range, ranges with a length of y at both sides of the origin. In addition, in accordance with a deviation amount in the sub scanning direction 71 between the position of the line having the highest density in the black belt-like image and the center of the length L1 of the book document, the control portion 5 may set the lengths at both sides of the line set as the enlargement correction range, so as to be different from each other.

[Step S87]

Then, in step S87, the control portion 5 derives an enlargement factor for the image in the enlargement correction range, and executes enlargement correction to enlarge the image in the enlargement correction range in the document image data, based on the derived enlargement factor.

Specifically, in the example shown in FIG. 8B, in the document image data, an image in a range with a length of 2·x of the book document P1 is reduced to an image with a length of 2·y. That is, an image in a range with a length of 2·x of the book document P1 is reduced with a reduction factor of y/x. Therefore, in step S87, the control portion 5 sets the enlargement factor for the image in the enlargement correction range to x/y. Thus, the control portion 5 when setting the enlargement factor for an image at the central portion P2 based on the height H of lifting at the central portion P2 of the book document P1 and the length L2 which is the reduction width of the book document P1 corresponds to an enlargement factor setting portion. Thereafter, the control portion 5 enlarges, in the sub scanning direction 71, the image in the enlargement correction range by x/y which is set as the enlargement factor. Thus, in the enlargement correction range, an image with a length of 2·y is enlarged to an image with a length of 2·x, so that distortion caused by reduction is corrected. It is noted that the control portion 5 enlarges the image data on a one-line basis or a several-line basis.

In the case where the slope shape of lifting occurring at the central portion P2 of the book document P1 is linear, it is desirable to enlarge the entire enlargement correction range uniformly with the enlargement factor of x/y. On the other hand, as described above, the slope shape of lifting occurring at the central portion P2 of the book document P1 may be approximate to a curve based on an exponential function, a logarithmic function, or the like. Particularly, the slope of the curve often becomes steeper as approaching the center of the central portion P2. Therefore, the control portion 5 may change the enlargement factor such that the closer to the center in the sub scanning direction 71 of the enlargement correction range, the greater the enlargement factor for the image in the enlargement correction range is. More specifically, the control portion 5 may enlarge the image data in the enlargement correction range, based on a calculation expression including an exponential function or a logarithmic function set in advance such that the closer to the center of the central portion P2 in the sub scanning direction 71, the greater the enlargement factor is, and such that the average of the enlargement factor in the enlargement correction range is x/y.

Figure 9:
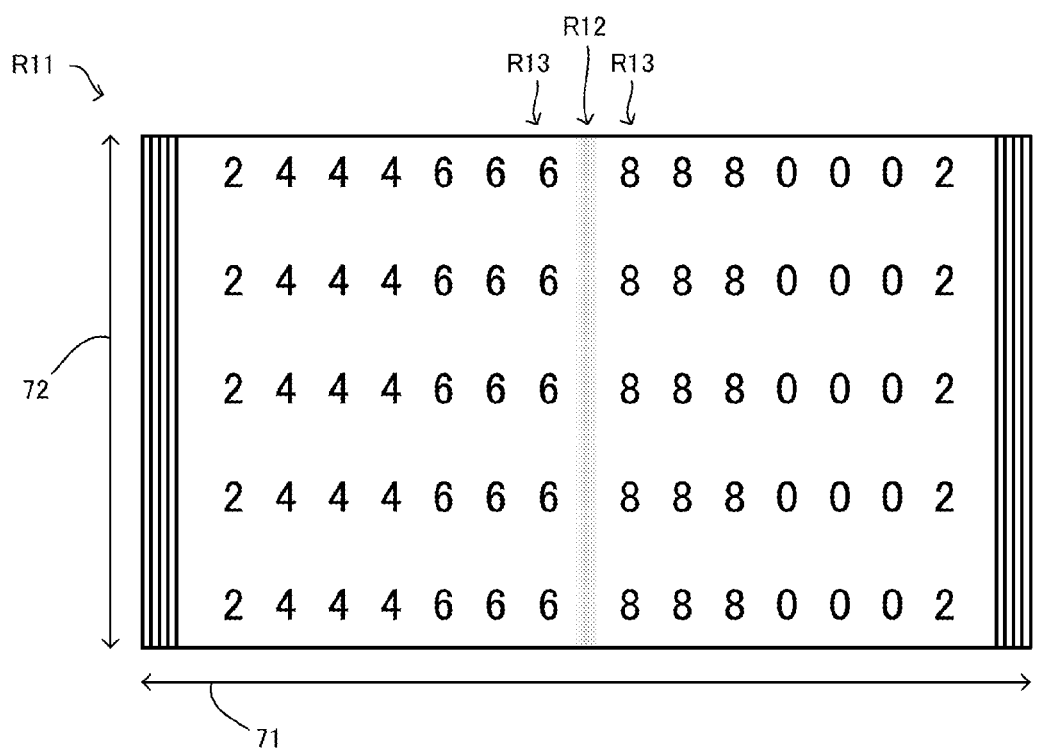
FIG. 9 is a diagram showing an example of a result of image processing for book document executed by the multifunction peripheral shown in FIG. 1A.

Here, FIG. 9 is a diagram showing an example of a result of execution of the density correction processing and the enlargement correction processing for the document image data R1 (see FIG. 3). The density of a belt-like image R12 in the document image data R11 after correction shown in FIG. 9 is suppressed as compared to the belt-like image R2 in the document image data R1 before execution of the density correction processing. In addition, a character image R13 in the document image data R11 after correction shown in FIG. 9 is enlarged in the sub scanning direction 71, so that distortion is suppressed, as compared to the belt-like image R3 in the document image data R1 before execution of the enlargement correction processing. Particularly, when the density correction processing and the enlargement correction processing are most appropriately performed, the belt-like image R12 is removed and the character image R13 is returned to the size of the original character image.

In the present embodiment, the case where a black belt-like image formed by a lifting portion at the central portion of the book document is parallel to the main scanning direction 72 has been described as an example. On the other hand, in the case where the book document P1 shown in FIG. 2 is rotated by 90 degrees and placed on the document placement surface 111, a black belt-like image is formed in parallel to the sub scanning direction 71, and an image at the central portion is reduced in the main scanning direction 72. The present disclosure is also applicable to such a case. More specifically, in step S6, the control portion 5 may determine whether or not a black belt-like image appears, for each of the sub scanning direction 71 and the main scanning direction 72. Then, the control portion 5 may execute the density correction processing and the enlargement correction processing in the image processing in step S8 in the sub scanning direction 71 or the main scanning direction 72, in accordance with the direction in which the black belt-like image has been detected. Thus, in the case where the black belt-like image is parallel to the sub scanning direction 71, the density correction processing suppresses the density of the belt-like image extending in parallel to the sub scanning direction 71, and the enlargement correction processing enlarges the central portion in the document image data in the main scanning direction 72.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a document table having a document placement surface which allows a document to be placed thereon;
an image reading portion configured to, based on light reflected when light is radiated through the document placement surface to a document placed on the document placement surface, read image data from the document;
a cover member configured to be openable and closable with respect to the document table, and having a color reference surface facing the document table and a partial region provided on the color reference surface, the partial region having a predetermined density different from a density of the color reference surface;
a reading control portion configured to read image data from the color reference surface and the partial region of the cover member by the image reading portion;
a document determination portion configured to, when a first density difference which is a density difference between a density of the color reference surface and a density of the partial region in color reference image data read by the reading control portion is equal to or smaller than a predetermined first threshold value, determine that the document placed on the document placement surface is a book document; and
a density correction portion configured to, when the document determination portion determines that the document is a book document, correct a density in a specific density correction range at a central portion in document image data read from the document by the image reading portion, based on a second density difference which is a density difference between a density of the color reference surface read by the reading control portion when the book document is placed on the document placement surface, and a density of the color reference surface read by the image reading portion when the cover member is closed.

2. The image reading device according to claim 1, wherein when the first density difference is equal to or smaller than the first threshold value and a predetermined belt-like image appears in the document image data, the document determination portion determines that the document placed on the document placement surface is a book document.

3. The image reading device according to claim 1, wherein the density correction portion corrects only image data whose density is equal to or smaller than a predetermined second threshold value, in the density correction range in the document image data.

4. The image reading device according to claim 3, wherein in determination of whether to correct image data, the density correction portion decreases the second threshold value as the distance from a center of the density correction range increases.

5. The image reading device according to claim 1, wherein the density correction portion decreases a correction amount for density in the density correction range as the distance from a center of the density correction range increases.

6. The image reading device according to claim 5, wherein the density correction portion corrects the document image data in accordance with the following expression (1) or (11), where, using the center of the density correction range as an origin, a line number at each correction target position is n, image data at the line number n before correction is $Y(n)$, image data at the line number n after correction is Y(n'), the second density difference is A, and the total number of lines included in the density correction range is N.

$$Y(n')=Y(n)-A\times(N-|n|)/N \qquad (1)$$

$$Y(n')=Y(n)+A\times(N-|n|)/N \qquad (11)$$

7. The image reading device according to claim 1, wherein the density correction portion changes the density correction range, based on the first density difference or the second density difference.

8. The image reading device according to claim 1, further comprising a document conveying portion configured to convey a document so as to pass through a reading position where the image reading portion reads image data, the document conveying portion also serving as the cover member, wherein
the document table has a conveyance reading surface which allows transmission of light radiated from the image reading portion to the document conveyed by the document conveying portion, and
the color reference surface and the partial region are provided so as to face the conveyance reading surface.

9. The image reading device according to claim 1, further comprising a storage portion storing in advance a density of the color reference surface read by the image reading portion when the book document is not placed on the document placement surface and the cover member is closed, wherein
the second density difference is a density difference between the density of the color reference surface read by the reading control portion when the book document is placed on the document placement surface, and the density of the color reference surface which has been read by the image reading portion when the book document is not placed on the document placement surface and the cover member is closed, and which is stored in the storage portion.

10. The image reading device according to claim 9, further comprising:
a book document detection portion configured to detect whether or not the book document is placed on the document placement surface; and
a control portion configured to store, into the storage portion, a density of the color reference surface read by the image reading portion when the book document detection portion has detected that the book document is not placed on the document placement surface, and the cover member is closed.

11. An image forming apparatus comprising:
the image reading device according to claim 1; and
an image forming portion configured to form an image based on image data read by the image reading device.

12. The image reading device according to claim 1, further comprising:
a height estimation portion configured to estimate the height of lifting at a central portion of the document, based on the second density difference which is the density difference between the density of the color reference surface read by the reading control portion and the density of the color reference surface read by the image reading portion when the cover member is closed; and
an enlargement correction portion configured to, when the document determination portion determines that the document is a book document, enlarge an image in a specific enlargement correction range at the central portion of the document image data read from the document by the image reading portion, with an enlargement factor based on the height estimated by the height estimation portion.

13. The image reading device according to claim 12, wherein the enlargement correction portion includes: a difference acquiring portion configured to acquire a difference between the length of spread pages of the document and the length of a target to be read by the image reading portion on the spread pages of the document placed on the document placement surface; and an enlargement factor setting portion configured to set the enlargement factor, based on the height estimated by the height estimation portion and the difference acquired by the difference acquiring portion.

14. The image reading device according to claim 12, wherein the enlargement correction portion changes the enlargement factor for the image in the enlargement correction range such that the closer to a center of the enlargement correction range, the greater the enlargement factor is.

15. The image reading device according to claim 12, wherein the enlargement correction portion sets the enlargement correction range, based on the second density difference.

16. An image forming apparatus comprising:
the image reading device according to claim 12; and
an image forming portion configured to form an image based on image data read by the image reading device.

17. An image reading method executed by an image reading device that includes: a document table having a document placement surface which allows a document to be placed thereon; an image reading portion configured to, based on light reflected when light is radiated through the document placement surface to a document placed on the document placement surface, read image data from the document; and a cover member configured to be openable and closable with respect to the document table, and having a color reference surface facing the document table and a partial region provided on the color reference surface, the partial region having a predetermined density different from a density of the color reference surface, the image reading method comprising:
a reading control step of reading image data from the color reference surface and the partial region of the cover member by the image reading portion;
a document determination step of, when a first density difference which is a density difference between a density of the color reference surface and a density of the partial region in color reference image data read in the reading control step is equal to or smaller than a predetermined first threshold value, determining that the document placed on the document placement surface is a book document; and
a density correction step of, when it is determined in the document determination step that the document is a book document, correcting a density in a specific density correction range at a central portion in document image data read from the document by the image reading portion, based on a second density difference which is a density difference between a density of the color reference surface read in the reading control step when the book document is placed on the document placement surface, and a density of the color reference surface read by the image reading portion when the cover member is closed.

18. The image reading method according to claim 17, further comprising:
a height estimation step of estimating the height of lifting at a central portion of the document, based on the second density difference which is the density difference between the density of the color reference surface read in the reading control step and the density of the color reference surface read by the image reading portion when the cover member is closed; and an enlargement correction step of, when it is determined in the document determination step that the document is a book document, enlarging an image in a specific enlargement correction range at the central portion of the document image data read from the document by the image reading portion, with an enlargement factor based on the height estimated in the height estimation step.

* * * * *